United States Patent [19]
Ikeda

[11] Patent Number: 4,667,227
[45] Date of Patent: May 19, 1987

[54] COLOR IMAGE READING APPARATUS

[75] Inventor: Yoshinori Ikeda, Tokyo, Japan

[73] Assignee: Canon Kabushiki Kaisha, Tokyo, Japan

[21] Appl. No.: 724,300

[22] Filed: Apr. 17, 1985

[30] Foreign Application Priority Data

Apr. 23, 1984 [JP] Japan .................................. 59-81492

[51] Int. Cl.$^4$ ............................................. H04N 1/46
[52] U.S. Cl. ........................................ 358/75; 358/51
[58] Field of Search ...................... 358/29, 75, 163, 51

[56] References Cited

U.S. PATENT DOCUMENTS

| | | | |
|---|---|---|---|
| 4,136,360 | 1/1979 | Hoffrichter et al. .................. | 358/80 |
| 4,358,794 | 11/1982 | Kurakami et al. ................... | 358/293 |
| 4,368,482 | 1/1983 | Machida et al. ...................... | 358/29 |
| 4,454,532 | 6/1984 | Itani et al. .............................. | 358/29 |
| 4,523,229 | 6/1985 | Kanmoto ............................. | 358/163 |
| 4,524,388 | 6/1985 | Abe et al. .............................. | 358/163 |
| 4,544,952 | 10/1985 | Pham van Cang ................... | 358/51 |
| 4,554,583 | 11/1985 | Saitoh et al. ......................... | 358/163 |
| 4,593,311 | 6/1986 | Levine ................................... | 358/51 |

FOREIGN PATENT DOCUMENTS

| | | | |
|---|---|---|---|
| 79567 | 6/1980 | Japan ..................................... | 358/163 |
| 58370 | 5/1981 | Japan ..................................... | 358/75 |

Primary Examiner—Howard W. Britton
Attorney, Agent, or Firm—Fitzpatrick, Cella, Harper & Scinto

[57] ABSTRACT

Apparatus apparatus for reading a color image by color separation with plural linear image sensors. The positional registration of color-separated images is achieved by reading a reference mark.

23 Claims, 9 Drawing Figures

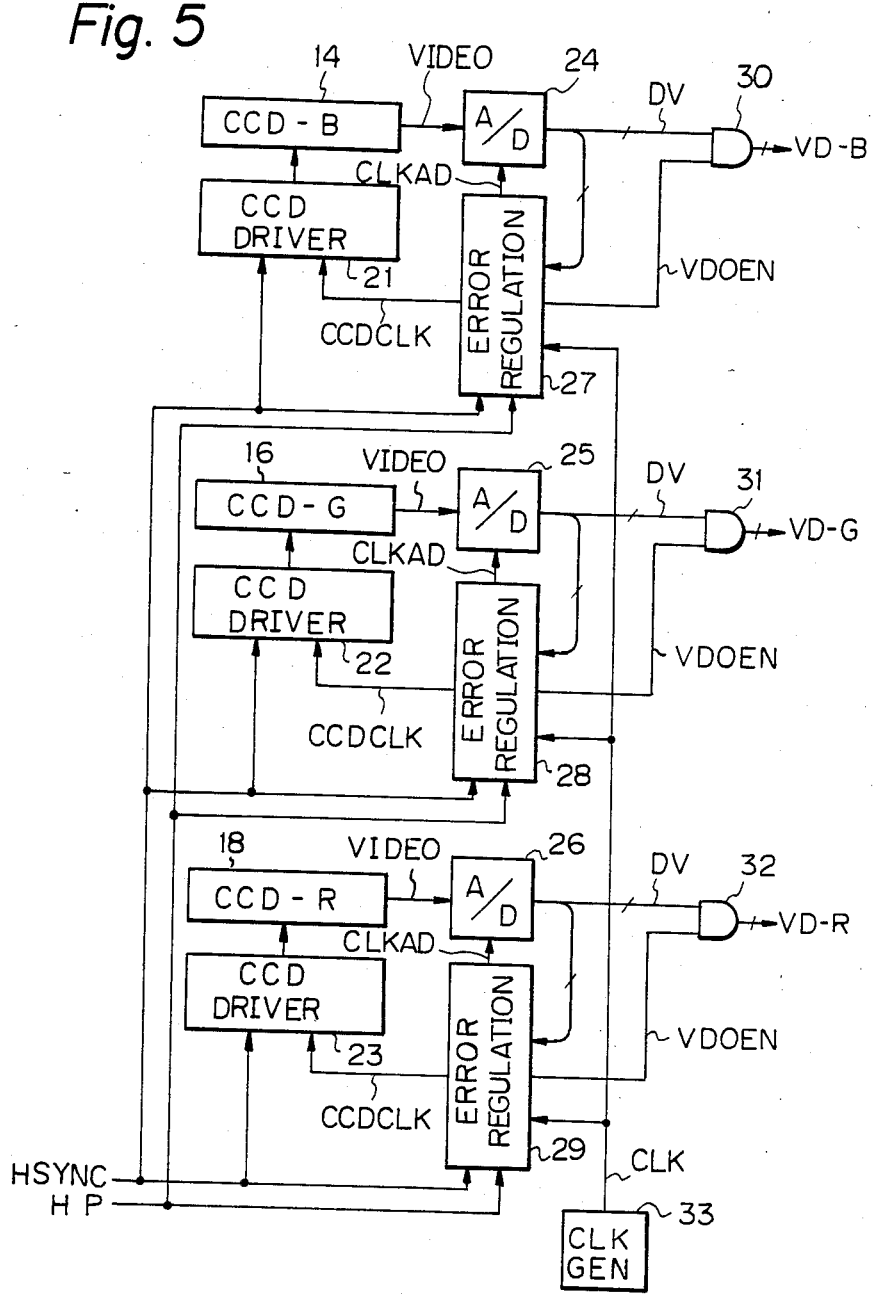

COLOR IMAGE READING APPARATUS

BACKGROUND OF THE INVENTION

1. Field of the Invention

The present invention relates to a color image reading apparatus for reading a color image by color separation.

2. Description of the Prior Art

There have recently been proposed various apparatus for color-separating a color original image with color separating filters, and generating color image signals by photoelectrically reading such color-separated images with plural linear image sensors, composed for example of charge-coupled devices (CCD) and provided respectively for different colors, for the purpose of reproduction of the original color image, transmission thereof to a distant location or storage thereof in an optical disk.

In such apparatus, the elimination of positional errors in color image reading is an important factor for reproducing the original color image without error in the registration of the color-separated images. It is extremely difficult, however, to mechanically adjust the positions of plural linear image sensor in such a manner that their image-reading positions exactly coincide with one another since the plural linear image sensors have to be spatially separated from one another. In addition, even if the sensors are correctly adjusted at the time of shipment from the manufacturing site, positional error may develop according to the condition of use, with the lapse of time-, or because of an external shock.

SUMMARY OF THE INVENTION

In consideration of the foregoing, an object of the present invention is to provide a color image reading apparatus capable of exactly reading a color image.

Another object of the present invention is to provide a color image reading apparatus capable of obtaining plural distortion-free image signals corresponding to different colors by color separation of a color image.

Still another object of the present invention is to provide a color image reading apparatus capable of automatically compensating the mutual error in the image-reading positions of plural linear image sensors for reading the color image by color separation.

Still another object of the present invention is to provide a color image reading apparatus capable of electrically correcting the mutual error in the image-reading positions of plural linear image sensors for reading the color image by color separation.

The foregoing and still other objects of the present invention and the advantages thereof will become fully apparent from the following description.

BRIEF DESCRIPTION OF THE DRAWINGS

FIG. 5 is a block diagram showing a CCD driving circuit;

DETAILED DESCRIPTION OF THE PREFERRED EMBODIMENT

Figure 1:
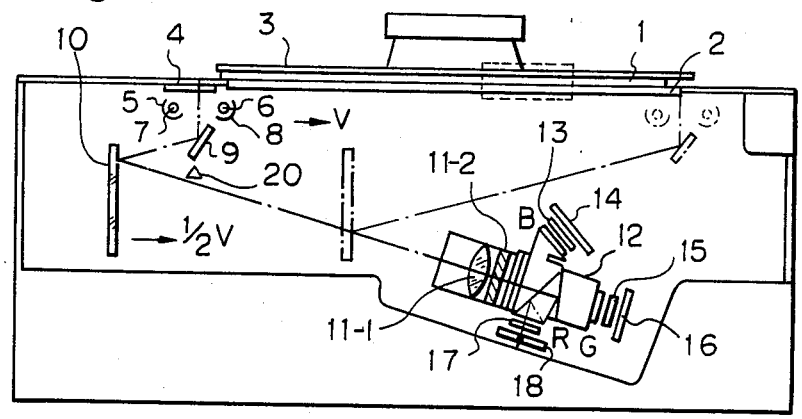
FIG. 1 is a schematic view of a color image reading apparatus embodying the present invention.

Now the present invention will be clarified in detail by reference to the preferred embodiment thereof. FIG. 1 shows a color image reading apparatus embodying the present invention, wherein are provided a platen 2 for supporting an original document 1; an original cover 3; halogen lamps 6, 7 for illuminating the original; and reflectors 5, 8. The light of the halogen lamps 6, 7 reflected by the original 1 is reflected by a first mirror 9 and a second mirror 10 and is focused by a lens 11-1. Then, after the elimination of a long wavelength component with a near-infrared cut-off filter 11-2, said light enters a color-separating dichroic filter block 12 for split into three optical paths, whereby the color-separated components of blue (400-500 nm), green (500-600 nm) and red (600-700 nm) respectively obtained with a blue (B) filter 13, a green (G) filter 15 and a red (R) filter 17 enter linear image sensors (CCD's) 14, 16, 18. The entire area of the original 1 can be read with the CCD's 14, 16, 18 as color component images, through a subsidiary scanning achieved by movement of the exposure lamps 5, 6 and the first mirror 9 with a speed V and of the second mirror 10 with a half speed V/2, from left to right in the drawing. After the completion of original reading, said lamps and mirrors move from right to left to the original position.

A calibrating plate 4, having a uniform color density, for example white, over the main scanning width of the CCD's 14, 16, 18, is placed in a position to be read by said CCD's 14, 16, 18 prior to the original scanning. A sensor 20 for detecting the position of the first mirror 9 releases a signal HP when said first mirror 9 is in a full-lined position shown in FIG. 1 whereby the calibrating plate 4 can be scanned with the CCD's.

Figure 2:
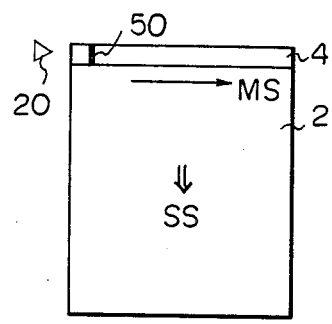
FIG. 2 is a schematic view of an original document table.

FIG. 2 schematically shows the platen 2 and the calibrating plate 4, wherein MS indicates the main scanning direction of CCD's while SS indicates the subsidiary scanning direction. As shown in FIG. 2, the calibrating plate 4 is positioned outside the platen 2 and is provided at a determined position with a reference line 50 for example of black color identifiable from the background, for example white, of said calibrating plate 4.

Said calibrating plate 4 is provided for automatic compensation, in the image reading apparatus shown in FIG. 1, of the errors in the image-reading positions of three CCD's 14, 16, 18 in the main scanning direction MS, and is scanned by the CCD's prior to the scanning of the original image to detect said errors, whereby the image reading operation of the CCD's is controlled in response to the result of said detection.

The calibrating plate 4 can be used not only for controlling the image-reading position of CCD's but also as a reference plate for correcting uneven sensitivity of the CCD's, detecting defective bits thereof and correcting the intensity of the illuminating lamps.

Figure 3A:
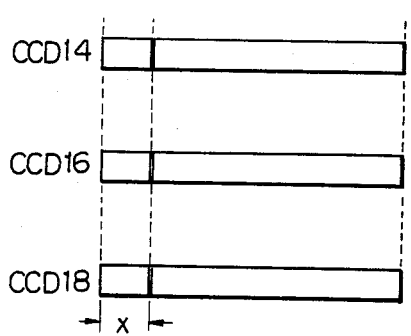
FIGS. 3(a) and 3(b) are charts showing the output signals of CCD's obtained by scanning a calibration plate.
Figure 3B:
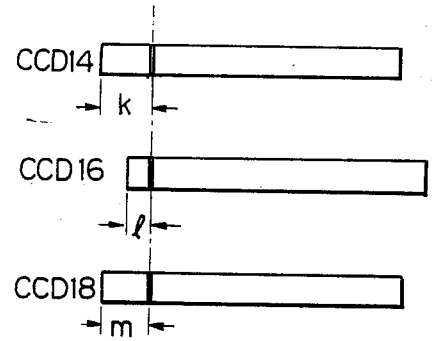

Now reference is made to FIG. 3 for explaining the outline of error correction in the image-reading positions of the CCD's. FIGS. 3(a) and 3(b) show the output signals of the CCD's obtained by scanning the calibrating plate 4. In the case that the image-reading positions of three CCD's 14, 16, 18 mutually coincide, signals corresponding to the reference line 50 occur in a same position in the outputs of said CCD's as shown in FIG. 3(a). In this state the signals corresponding to the reference line 50 appear in the i-th bit or pixel in all three CCD's so that no correction is needed in the reading operation of the CCD's.

Figure 4:
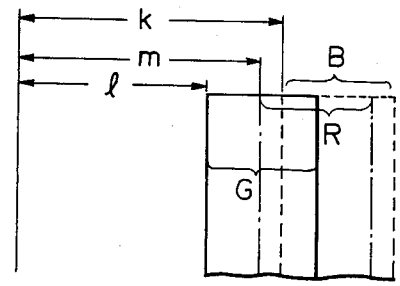
FIG. 4 is a view showing positional errors among signals representing of different colors.

On the other hand, in case an error exists in the image-reading positions of three CCD's, the outputs thereof are as shown in FIG. 3(b), wherein the signals corresponding to the reference line 50 are respectively at a k-th bit in the CCD 14, an l-th bit in the CCD 16 and an m-th bit in the CCD 18. Consequently, if three CCD's in the state shown in FIG. 3(b) are driven in normal manner with a common scanning start signal for initiating the signal read-out without any correction, color signals for example obtained by reading a black line perpendicular to the main scanning direction become mutually aberrated as shown in FIG. 4. Such aberration can be eliminated by controlling, for example by delaying, the read-out timing of the CCD's according to the amount of said aberration.

The reference line 50 on the calibrating plate 4 is preferably so positioned that it is projected on an end portion of the CCD's close to the read-out start side thereof. In this manner the pulse count to the detection of the reference line can be made smaller so that a counter circuit explained below can be of a smaller counting capacity.

In case a CCD of 5,000 pixels is employed for reading the longer side of a region of A4 size with a resolution of 16 pixels/mm, 4,752 pixels can be used for effective read-out and 248 pixels can be used for correcting the error in the image-reading position. Consequently, in the above-described manner, it is rendered possible to correct an error of 15 mm at maximum.

FIG. 5 is a block diagram showing a CCD driving circuit with the above-described error correcting function, wherein 14, 16 and 18 indicate CCD's similar to those shown in FIG. 1. Each CCD is provided with a linear array of plural photocells in which electric charges are accumulated according to the amounts of incident light. The accumulated charges of a line are simultaneously transferred to an unrepresented shift register by a shift pulse, and then are read as voltages in synchronization with clock signals. The CCD's 14, 16, 18 are respectively driven by CCD drivers 21-23. Analog image signals VIDEO respectively released from three CCD's 14, 16, 18 are supplied to A/D converters 24-26 for conversion into 8-bit digital image signals DV. AND gates 30-32 respectively control the supply of said digital image signals DV from the A/D converters 24-26 to an unrepresented processing circuit according to output control signals VDOEN.

Error regulation circuits 27-29 receive the digital output signals of the A/D converters 24-26 when the CCD's scan the aforementioned calibrating plate 4 to detect the error in the image-reading positions of the CCD's, and control the function of the CCD drivers 21-23 according to the result of said detection.

In FIG. 5 there are further shown a CCD clock signal CCDCLK for causing the transfer function of the CCD's; and A/D conversion clock signal CLKAD for determining the timing of the A/D conversion; a horizontal synchronization signal HSYNC for determining the timing of the main scanning operation of the CCD; an output signal HP of the sensor 20 shown in FIG. 1; and a clock generator 33 for generating reference clock signals of the present circuit.

Figure 6:
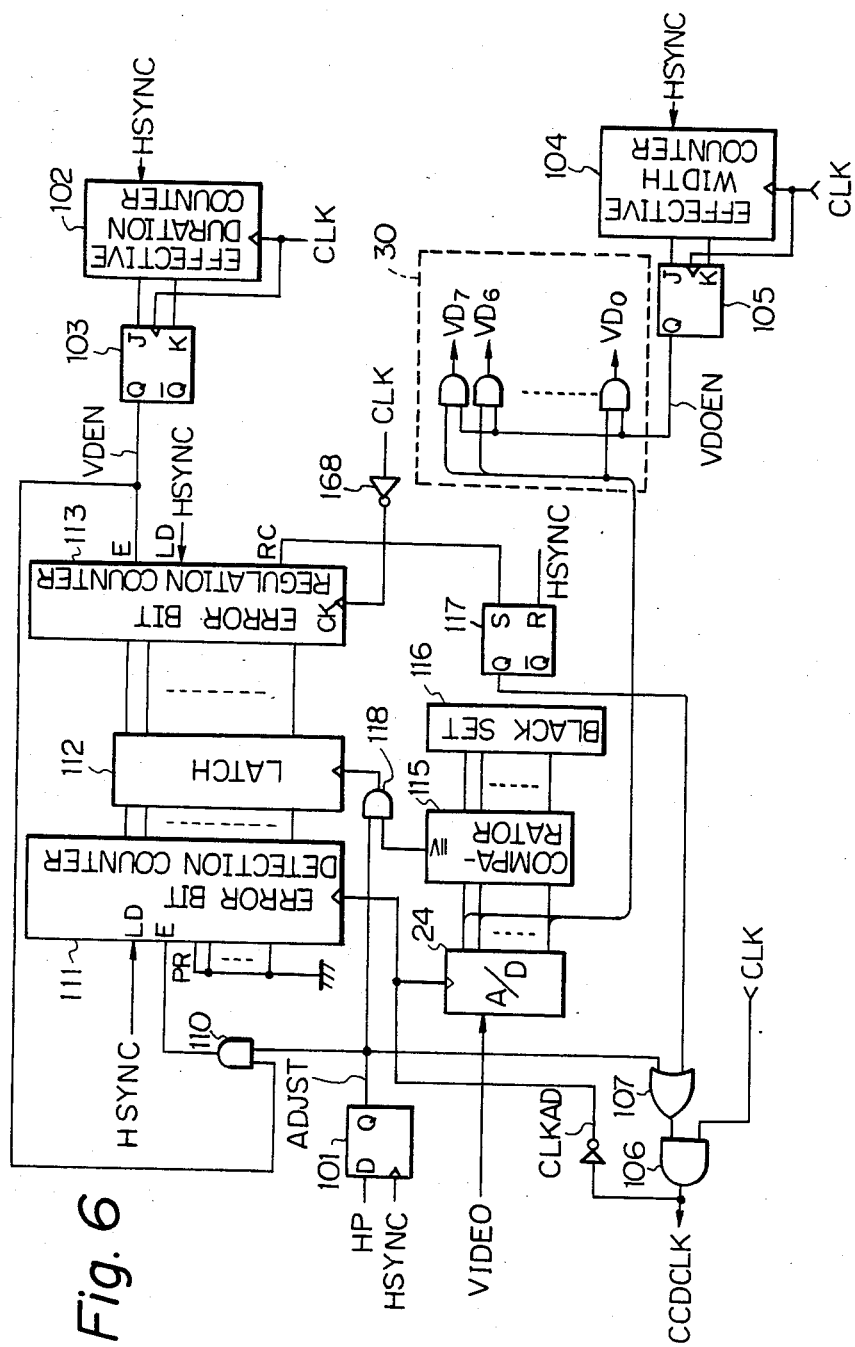
FIG. 6 is a circuit diagram showing details of the error correcting circuit shown in FIG. 5.
Figure 7:
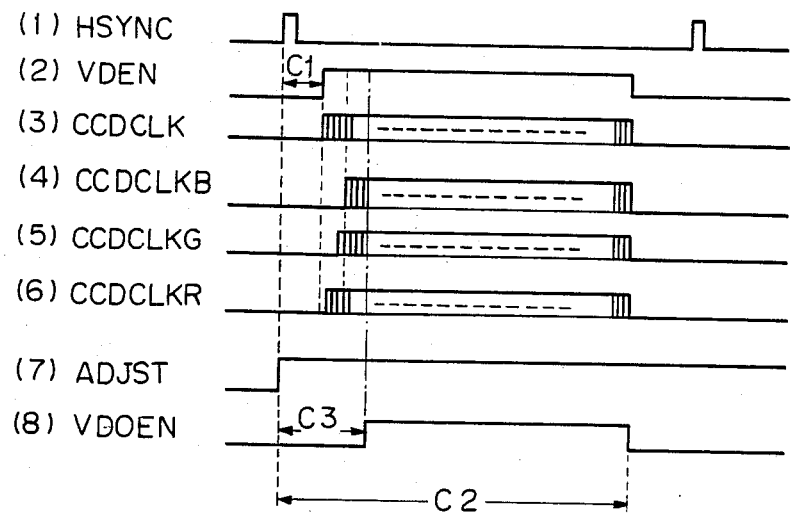
FIG. 7 is a timing chart showing the function of the circuit shown in FIG. 6.

FIG. 6 shows the details of the error regulation circuit 27 relating to the CCD 14, and FIG. 7 is a timing chart showing the function of the above-described circuit. For the purpose of clarity there are included the A/D converter 24 and the AND gate 30. The circuit structure relating to the CCD 16 or 18 is same as shown in FIG. 6 and will not therefore be explained.

In the following there will be given an explanation on signals ADJST, VDEN, VDOEN which are basic signals employed in the present circuit.

When the exposure lamps and the first mirror 9 are positioned at the calibrating plate 4 prior to the original image scanning, the sensor 20 releases the signal HP for supply to a flip-flop 101. If the horizontal synchronization signal HSYNC is entered during the output of the signal HP, the flip-flop 101 releases a high-level calibration timing signal ADJST at least during a horizontal scanning period. An effective duration counter 102 counts the reference clock pulses CLK from the entry of the signal HSYNC, and supplies a set signal to the J-input terminal of a flip-flop 103 when the count reaches a value C1. Said flip-flop 103 is set at the leading edge of a clock CLK after the entry of said set signal, whereby the Q-output signal assumes the high level state. The effective duration counter 102 supplies a reset signal to the K-input terminal of the flip-flop 103 when the count reaches a value C2. The flip-flop 103 shifts the Q-output signal to the low level state at the leading edge of a clock pulse CLK after the entry of said reset signal. Consequently, the counting is effected from the entry of the signal HSYNC, and the Q-output signal of the flip-flop 103 assumes the high level state from the count C1 to the count C2. Said Q-output signal of the flip-flop 103 constitutes the effective duration signal VDEN.

An effective width counter 104 initiates pulse counting operation from the entry of the signal HSYNC in the same manner as the aforementioned effective duration counter 102, releases a set signal to the J-input terminal of a flip-flop 105 when the count reaches a value C3 (>C1) and supplies a reset signal to the K-input terminal of the flip-flop 105 when the count reaches a value C2. Consequently the flip-flop 105 releases the high-level Q-output signal during a period from the count C3 to the count C2, and said Q-output signal constitutes the effective width signal VDOEN.

In the following there will be explained the correcting operation utilizing the above-explained three signals. In response to the signal ADJST from the flip-flop 101 while the first mirror 9 is located in the full-lined position in FIG. 1 to enable the CCD's to read the calibrating plate 4, an AND gate 107 is opened through an OR gate 106 whereby the reference clock pulses CLK are supplied as the CCD clock pulses CCDCLK to the CCD driver 21. In response thereto the CCD 14 initiates the transfer of the image signals. When the signal ADJST from the flip-flop 101 and the signal VDEN from the flip-flop 103 both assume the high-level state, an AND gate 110 releases a high-level signal to activate an error bit detection counter 111, whereby said counter counts the A/D conversion clock pulses CLKAD from the release of the effective duration signal VDEN, namely from the start of effective scanning. Said A/D conversion clock pulses CLKAD are obtained by inverting, with an inverter 107, the CCD clock pulses CCDCLK from the AND gate 106. An 8-bit digital image signal released from the A/D converter 24 in synchronization with the A/D conversion clock pulses CLKAD is compared in a comparator 115 with an 8-bit threshold signal supplied from a black setting circuit 116 to identify if the entered image signal is black or not. In case the entered digital image signal is larger than said threshold signal, the comparator 115 supplies a black detection signal to an AND gate 118, corresponding to the position of the reference line 50 on the calibrating plate 4. The AND gate 118 also receives the signal ADJST from the flip-flop 111, and thus supplies a latch signal to a latch 112 in response to the black detection by the comparator 115. Said latch 112 receives the count of the error bit detection counter 111, whereby there is latched the number of bits or pixels from the release of the effective duration signal VDEN to the detection of the reference line 50. The value thus latched (or number of error bits) is retained until the power supply is cut off or until the signal ADJST is released in a next error correcting operation.

The original image is scanned after the number of error bits is detected in the aforementioned manner by the reading of the calibrating plate 4. When the first mirror 9 starts movement for scanning the original image, the output of the sensor 20 is shifted to the low level state, so that the output signal ADJST of the flip-flop 101 also assumes the low level state. Consequently the AND gate 106, which has been maintained open by the signal ADJST through the OR gate 107 is closed to terminate the output of the CCD clock pulses CCDCLK. Simultaneously the output of the AD conversion clock pulses CLKAD is terminated.

After the start of original image scanning, the number of error bits obtained by the scanning of the calibrating plate 4 and retained in the latch 112 is set in an error bit regulation counter 113 in response to the horizontal synchronization signal HSYNC. Said counter 113 starts to count signals obtained by inverting the reference clock pulses CLK in an inverter 108, from the entry of the effective duration signal VDEN from the flip-flop 103. Said counter 113, being a down-counter, releases a carry signal RC after a count down of a preset value, and said carry signal RC is supplied to the set terminal of a flip-flop 117 to set the same. Said flip-flop 117 is reset, for each horizontal scanning, by the horizontal synchronization signal HSYNC. The Q-output signal of said flip-flop 117 opens the AND gate 106 through the OR gate 107, whereby the CCD clock pulses CCDCLK are released from said AND gate 106 after said carry signal RC. In this manner the CCD clock pulses CCDCLK are released as the driving clock pulses CCDCLKB for the CCD 14 with a delay corresponding to the number of error bits, for example K bits, obtained by reading the calibrating plate 4, as shown in FIG. 7(4). Consequently the first pixel of the CCD 14 is delayed by the number of said error bits.

As explained in the foregoing, in case a CCD of 5,000 pixels or bits is employed for reading the longer side of A4 size with a resolutin of 16 pixels/mm, 4,752 pixels are used for effective pixels and 248 pixels are used for error correction. In this manner the above-described error correction can cover a positional error of 15 mm for each CCD.

However, said range of 15 mm may be exceeded for example by a strong shock. The error correcting operation, if conducted for such significant positional error, will result in certain inconveniences such as the lack of an end portion of the image. Also if the reference line 50 does not exist in the reading range of the CCD or is not identified for example due to dusts on the calibrating plate 4, satisfactory image reading cannot be expected because the error correction has not been achieved.

In order to avoid such inconvenience, in the case that the CCD does not detect the reference line within a predetermined range, the original reading operation following the reading of the calibrating plate 4 is forbidden or an alarm is given to the operator, as satisfactory error correction or image reading is not to be expected.

Figure 8:
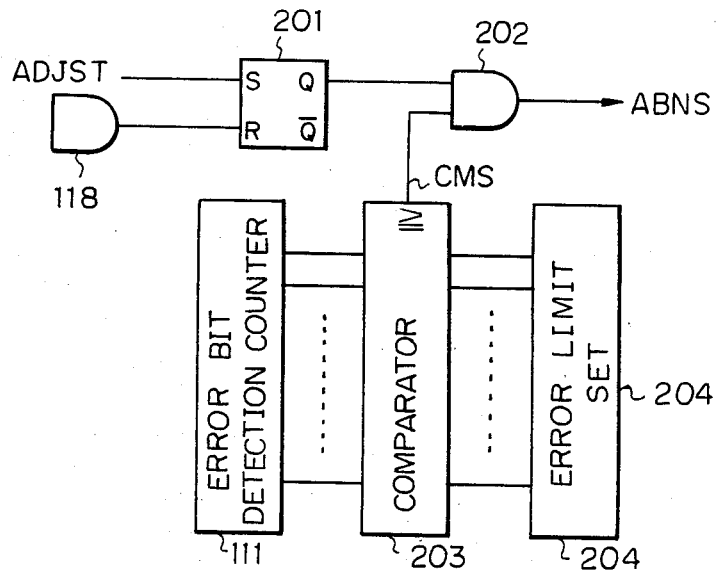
FIG. 8 is a circuit diagram showing an abnormality detecting circuit.

FIG. 8 shows a circuit for detecting such an abnormality, which is to be attached to the circuit shown in FIG. 6 and in which the same circuit blocks as those in FIG. 6 are represented by the same numbers.

An error bit detecting counter 111, same as that shown in FIG. 6, initiates the pulse counting operation when the signal VDEN from the flip-flop 103 (FIG. 6) and the signal ADJST from the flip-flop 101 (FIG. 6) both assume the high level state as explained before. An error limit setting circuit 204 sets a value corresponding to the limit of error correction in relation to the number of total pixels in CCD and the number of effective pixels, and a comparator 203 identifies whether the count of the error bit detecting counter 111 reaches the value set in said error limit setting circuit 204.

A flip-flop 201 is reset by the output of the AND gate 118 shown in FIG. 6 and is set at the leading edge of the signal ADJST from the flip-flop 101. Consequently said flip-flop 201 is set at the start of the reading of the calibrating plate 4 and is reset when the reference line 50 is detected by the CCD.

The comparison output signal CMS from the comparator 203 and the output signal of the flip-flop 201 are supplied to an AND gate 202, which releases an abnormality signal ABNS when both output signals assume the high level state. Thus said abnormality signal ABNS is generated in case the reference line 50 is not identified by the CCD after the count of the error bit detecting counter 111 exceeds the value set in the error limit setting circuit 204.

As explained above, the abnormality signal ABNS is obtained in case the CCD is misaligned in excess of the maximum error correction limit or in case the reference line 50 is not identifiable due to dust deposition on the calibrating plate 4, and said abnormality signal can be utilized to inhibit the succeeding original image reading operation and to display a message on an unrepresented display unit for informing the operator of an abnormal state. In this manner it is rendered possible to achieve secure and effective error correction, thus avoiding the image signals involving errors resulting from inappropriate original image reading with unsatisfactory error correction.

The circuit shown in FIG. 8 is to be provided for each of the three CCD's.

Each of the other CCD's 16, 18 is associated with the circuits shown in FIGS. 6 and 8 for achieving the same correcting operation, and the driving clock pulses CCDCLK for each CCD are independently controlled according to the effective duration signal VDEN. In this manner the correction for the error in the image-reading positions of CCD's in the main scanning direction is achieved by controlling the signal read-out start timing of the CCD's according to the amount of detected error.

The detection of the number of error bits for the above-described error correction may be conducted for every original image scanning, or for an every determined number of such original image scannings, or at a predetermined occasion, for example after the start of power supply to the apparatus.

In the foregoing embodiment there is explained a structure in which the original image is fixed and the subsidiary scanning is achieved by displacement of mirrors, but the present invention is naturally applicable to other structures in which the original image or the platen supporting the original image is movable. Also the foregoing embodiment employs color separation into red, green and blue, but the present invention is likewise applicable to color separation into other combination of three colors, for example, yellow, magenta and cyan, or to color separation into two colors. Naturally, the number of linear image sensors is adjusted according to the number of separated colors. The present invention is further applicable to a color image reading apparatus utilizing transmission, for example for reading a color photograph.

Furthermore, the error correction may also be achieved, instead of delaying the start of CCD clock pulses, by expediting the start of CCD clock pulses or by fixing the clock pulses for one CCD and controlling those for the two other CCD's. The present invention is furthermore applicable to an image reading apparatus in which the image of a line is read by plural linear sensors in a divided manner.

The linear image sensors to be employed in the present invention are not limited to CCD's but can be any other linear sensors in which the signals are transferred in synchronization with clock signals.

Furthermore, the error correction may be achieved, instead of controlling the driving clock signal of the linear image sensors, by storing the output signals of the linear sensors into suitable memories such as random access memories and delaying or expediting the timing of signal write-in or signal read-out according to the amount of detected error. The error correction is also similarly achievable by controlling the addresses for signal write-in or read-out in such memories.

As explained in the foregoing, the present invention allows to securely correct the errors in the image-reading positions in plural linear image sensors in reading a color image, thus enabling satisfactory color image reading without highly precise mechanical adjustments.

What is claimed is:

1. A color image reading apparatus comprising:
    plural linear image sensors for reading a color image by color separation, each of said plural linear image sensors generating an associated one of plural color component signals;
    means for detecting deviation in the image-reading positions of said plural linear image sensors; and
    means for correcting the deviation in the image-reading positions of said plural linear image sensors in accordance with the result of detection by said detecting means.

2. A color image reading apparatus according to claim 1, wherein said detecting means is operable to detect the deviation in accordance with the output signals from said plural linear image sensors.

3. A color image reading apparatus according to claim 1, wherein said correcting means is adapted to independently control the timings of image reading of said plural linear image sensors.

4. A color image reading apparatus according to claim 3, wherein said correcting means is adapted to independently control clock signals for operation of said plural linear image sensors.

5. A color image reading apparatus according to claim 1, further comprising a reference member indicating a reference position for the image reading by said plural linear image sensors, wherein said detecting means is operable to detect the deviation in accordance with the output signals obtained by reading said reference member with said plural linear image sensors.

6. A color image reading apparatus according to claim 5, wherein said plural linear image sensors are adapted to read said reference member prior to the reading of said color image.

7. A color image reading apparatus according to claim 1, further comprising means for identifying a state in which said correcting means is incapable of correcting the deviation.

8. A color image reading apparatus comprising:
    plural linear image sensors for reading a color image by color separation, each of said plural linear image sensors generating an associated one of plural color component signals;
    drive means for driving said plural linear image sensors to perform image reading operation; and
    means for controlling said drive means to independently regulate the timing of image reading operation of said plural linear image sensors, so as to correct deviation in image-reading positions of said plural linear image sensors.

9. A color image reading apparatus according to claim 8, wherein said drive means comprises plural driving circuits respectively corresponding to said plural linear image sensors.

10. A color image reading apparatus according to claim 8, wherein said control means is adapted to control the start timing of the drive signals to be respectively supplied to said plural linear image sensors.

11. A color image reading apparatus according to claim 8, wherein said control means is operable to control said drive means in accordance with the amount of deviation in the image-reading positions of said plural linear image sensors.

12. A color image reading apparatus according to claim 11, further comprising means for detecting the deviation in the image-reading positions of said plural linear image sensors, wherein said control means performs the control operation in accordance with the result of detection of said detecting means.

13. A color image reading apparatus according to claim 8, wherein said control means is adapted to perform control function for each scanning operation of said plural linear image sensors.

14. A color image reading apparatus comprising:
    plural linear image sensors for reading a color image by color separation, each of said plural linear image sensors generating an associated one of plural color component signals;
    a reference member for indicating a reference position for image reading of said plural linear image sensors; and
    means for correcting deviation in image-reading positions of said plural linear image sensors in accordance with output signals obtained by reading said reference member with said plural linear image sensors.

15. A color image reading apparatus according to claim 14, wherein said correcting means is adapted to control the image-reading operation of said plural linear image sensors.

16. A color image reading apparatus according to claim 14, wherein said plural linear image sensors are adapted to read said reference member prior to the reading of said color image.

17. A color image reading apparatus according to claim 14, further comprising means for detecting the deviation in the image-reading positions of said plural linear image sensors from output signals obtained by reading said reference member with said plural linear image sensors, wherein said means is operable to correct the deviation in accordance with the result of detection by said detecting means.

18. A color image reading apparatus according to claim 17, further comprising means for storing the result of detection by said detecting means.

19. A color image reading apparatus according to claim 18, wherein said identifying means identifies that the amount of deviation detected by said detecting means exceeds a predetermined value.

20. A color image reading apparatus comprising:
plural linear image sensors for reading a color image by color separation, each of said plural linear image sensors generating an associated one of plural color component signals;
means for detecting deviation in the image-reading positions of said plural linear image sensors; and
means for identifying whether or not the color image reading operation with said plural linear image sensors is possible in accordance with the result of detection by said detecting means.

21. A color image reading apparatus according to claim 20, wherein said identifying means is adapted to display the result of identification.

22. A color image reading apparatus according to claim 20, further comprising means for correcting the deviation in the image-reading positions of said plural linear image sensors in accordance with the result of detection by said detecting means.

23. A color image reading apparatus according to claim 20, wherein said detecting means is operable to detect the deviation in accordance with the output signals from said plural linear image sensors.

* * * * *

UNITED STATES PATENT AND TRADEMARK OFFICE
CERTIFICATE OF CORRECTION

PATENT NO. : 4,667,227
DATED : May 19, 1987
INVENTOR(S) : YOSHINORI IKEDA

It is certified that error appears in the above-identified patent and that said Letters Patent is hereby corrected as shown below:

AT [57] IN THE ABSTRACT

Line 1,   "apparatus" should be deleted.

COLUMN 1

Line 25,   "sensor" should read --sensors--.
    Line 32,   "time-," should read --time,--.
    Line 66,   "of" should be deleted.

COLUMN 2

Line 22,   "split" should read --splitting--.

COLUMN 5

Line 10,   "flip-flop 111," should read --flip-flop 101,--.
    Line 30,   "AD" should read --A/D--.
    Line 58,   "resolutin" should read --resolution--.

UNITED STATES PATENT AND TRADEMARK OFFICE
CERTIFICATE OF CORRECTION

PATENT NO. : 4,667,227

DATED : May 19, 1987

INVENTOR(S) : YOSHINORI IKEDA

It is certified that error appears in the above-identified patent and that said Letters Patent is hereby corrected as shown below:

COLUMN 7

Line 32, "signal" should read --signals--.

COLUMN 9

Line 17, "claim 18," should read --claim 20,--.

Signed and Sealed this

Sixth Day of October, 1987

Attest:

DONALD J. QUIGG

*Attesting Officer*   *Commissioner of Patents and Trademarks*